United States Patent [19]
Field et al.

[11] Patent Number: 5,368,698
[45] Date of Patent: Nov. 29, 1994

[54] WATER DISTILLATION APPARATUS

[75] Inventors: George R. Field, Edmonton, Canada; Wallace B. Bolte, Bismark, N. Dak.; Norman N. Pepin, Sherwood Park, Canada

[73] Assignee: Big Iron Drilling Ltd., Edmonton, Canada

[21] Appl. No.: 208,588

[22] Filed: Mar. 11, 1994

[30] Foreign Application Priority Data

Mar. 12, 1993 [CA] Canada ............................. 2092612

[51] Int. Cl.⁵ ............................................. B01D 3/42
[52] U.S. Cl. ................................... 202/180; 202/160; 202/181; 202/193; 202/194; 202/195; 202/196; 203/1; 203/2; 203/10; 203/DIG. 18
[58] Field of Search ............... 202/180, 181, 160, 206, 202/190, 192–196; 203/1, 2, 10, DIG. 18; 137/391

[56] References Cited

U.S. PATENT DOCUMENTS

| | | | |
|---|---|---|---|
| 1,043,305 | 11/1912 | Duensing | 202/191 |
| 2,376,146 | 3/1945 | Jacocks | 202/192 |
| 2,398,842 | 4/1946 | Morse | 202/189 |
| 3,000,795 | 9/1961 | Goeldner | 203/10 |
| 3,393,131 | 7/1968 | McIntyre, Jr. | 202/190 |
| 3,507,753 | 4/1970 | Jacuzzi | 202/193 |
| 3,870,605 | 3/1975 | Sakamoto | 202/190 |
| 4,089,750 | 5/1978 | Kirschman et al. | 202/180 |

FOREIGN PATENT DOCUMENTS 1089402  11/1980  Canada .

Primary Examiner—Virginia Manoharan
Attorney, Agent, or Firm—George A. Seaby

[57] ABSTRACT

A water distillation apparatus includes a cylindrical housing with a first cover thereon, a pair of spaced apart funnel-shaped partitions, a second cover on the uppermost partition and a skirt extending downwardly from the periphery of the cover and the uppermost partition to a location above the bottom of the housing, the partitions and skirt dividing the interior of the housing into an inlet reservoir chamber for cold water above the first partition, a lower boiling chamber beneath the second partition and an inclined condensation passage between the partitions. Cold water is introduced through a pipe and solenoid valve into the bottom of the reservoir chamber for overflow through an opening in the second cover into the boiling chamber. A heater in the boiling chamber heats the water to produce steam which rises, passing into the condensation passage and flowing downwardly to a central drain for discharge into a distilled water reservoir beneath the housing. An overflow pipe connects the top of the casing to the drain so that during filling of the inlet reservoir chamber, the bulk of the water overflows from the reservoir chamber to the drain to flush deposits from the housing.

10 Claims, 3 Drawing Sheets

WATER DISTILLATION APPARATUS

BACKGROUND OF THE INVENTION

1. Field of the Invention

This invention relates to a water distillation apparatus and in particular to a distillation apparatus for home use.

2. Discussion the prior Art

The apparatus described herein is similar in many respects to the apparatus disclosed by Canadian Patent No. 1,089,402, which issued to Fred C. Kirschman et al on Nov. 11, 1980. While the Kirschman et al apparatus is relatively simple and efficient, a problem with such apparatuses is the build up of deposits in the boiling chamber. Another drawback of existing apparatuses is that of cleaning. Moreover, there is no provision for the separation or escape of volatile organic compounds or other low boiling contaminants from the inlet water. Finally, the use of an L-shaped drain tube results in the discharge of steam from the drain. In some localities, the law prohibits the discharge of steam from such an apparatus, necessitating the use of a long outlet tube to ensure sufficient cooling.

GENERAL DESCRIPTION OF THE INVENTION

An object of the present invention is to provide an improved distillation apparatus with reduced deposit build up, and which is relatively easy to clean.

Another object of the invention is to provide a distillation apparatus which facilitates the separation of low boiling (volatile) contaminants from inlet water, i.e. the water introduced into the water for distillation.

Yet another object of the invention is the provision of a distillation apparatus which prevents the escape of steam.

Accordingly, the present invention relates to a water distillation apparatus comprising housing means; first and second spaced apart, inverted conical-shaped partition means in said housing means; skirt means extending downwardly from the open upper end of said first partition means to a location above the bottom of said housing means, said first and second partition means and said skirt means dividing the interior of the housing means into an inlet reservoir chamber for cold water above said first partition means, a lower boiling chamber beneath said second partition means and an inclined condensation passage between said first and second partition means; inlet means for introducing water into the bottom of said reservoir chamber for overflow into said boiling chamber; first valve means in said inlet means controlling the flow of water into said reservoir chamber; heater means in said boiling chamber for heating water in said boiling chamber to produce steam; drain means in said boiling chamber for discharging water from the boiling chamber when the water exceeds a predetermined level in said boiling chamber; outlet means in fluid communication with said condensation passage for discharging water condensing therein from said housing means; cover means on the open upper end of said first partition means; a first opening in said cover means permitting the overflow of water to said boiling chamber; overflow means providing fluid communication between said cover means and said drain means, whereby during filling of said reservoir chamber water overflows into said boiling chamber, and because of over filling, excess water overflows from said reservoir chamber and from said boiling chamber into said drain means to reduce mineral deposits in said housing means.

BRIEF DESCRIPTION OF THE DRAWINGS

The invention will be described in greater detail with reference to the accompanying drawings, which illustrate preferred embodiments of the invention, and wherein.

DESCRIPTION OF PREFERRED EMBODIMENT

Figure 1:
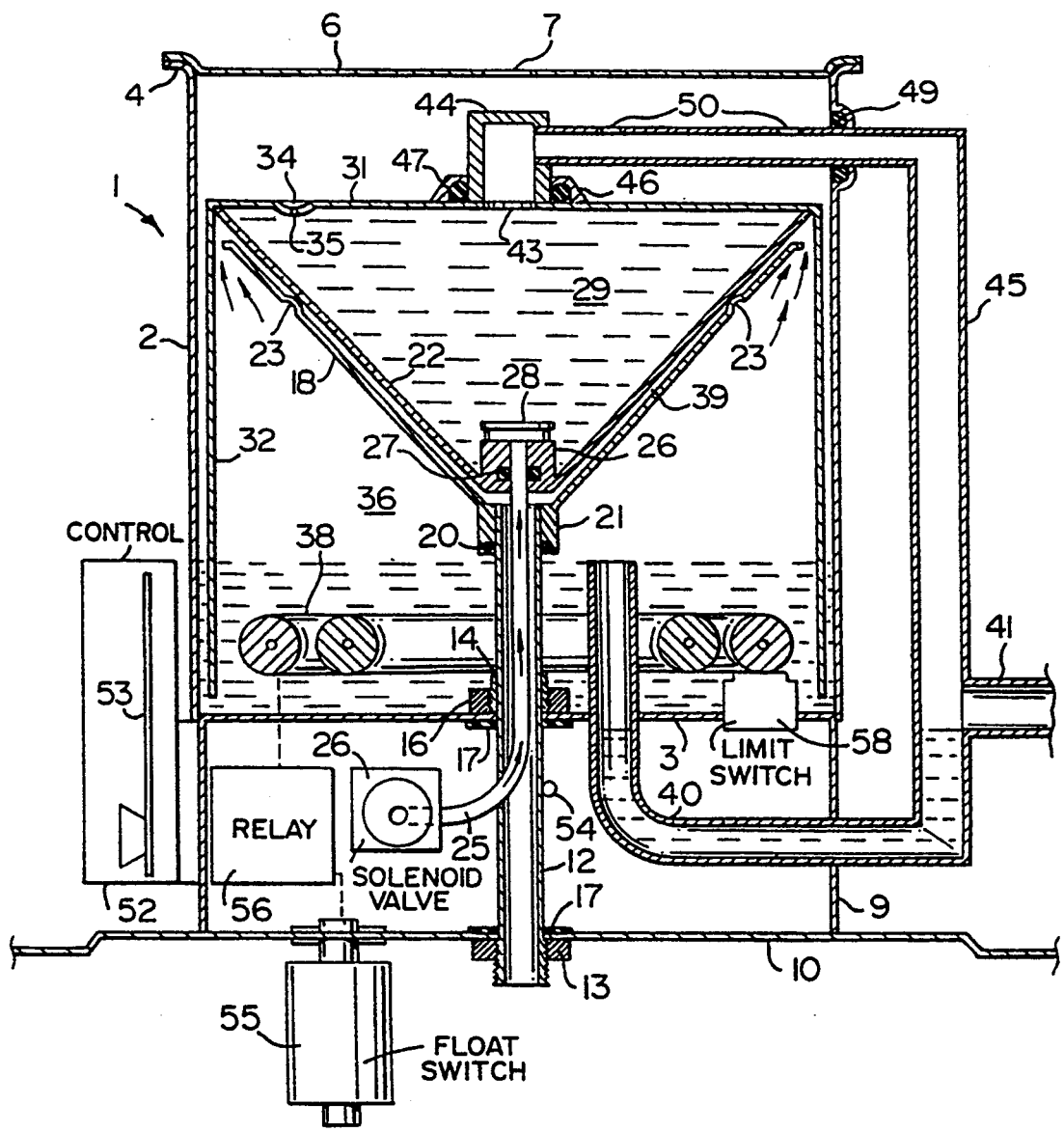
FIG. 1 is a longitudinal sectional view of a water distillation apparatus in accordance with the present invention.

With reference to the drawings, the distillation apparatus of the present invention includes a housing generally indicated at 1 defined by a cylindrical side wall 2 and a bottom wall 3. The open upper end 4 of the housing 1 is normally closed by a cover 6, which has a central vent opening 7 for discharging gases from the housing 1. As used herein, the term "gases" is intended to include vapor. A cylindrical base 9 supports the housing 1 on the top wall 10 of a reservoir or tank (not shown) which receives distilled water from the apparatus.

An outlet pipe 12 extends from the top wall 10 of the reservoir upwardly through the bottom wall 3 of the housing 1. The pipe 12 is threaded for receiving a bottom nut 13 connecting the pipe to the wall 10. A threaded sleeve 14 on the pipe 12 receives a second nut 16 for connecting the pipe 12 to the housing bottom wall 3. Washers 17 form seals between the pipe 12 and the walls 3 and 10. A partition in the shape of an inverted cone 18 is mounted on the upper end of the outlet pipe 12. A seal in the form of an 0-ring 20 is provided between the cylindrical bottom, outlet end 21 of the partition 18 and the pipe 12.

A second inverted cone-shaped partition 22 is mounted in the housing 1 above and spaced apart from the partition 18. The second partition 22 is coaxial with the first partition 18. Projections 23 (one shown) on the lower partition 18 maintain the spacing between the partitions. The upper partition 22 is supported by the projections 23 and centered by the top end of an inlet pipe 25. The pipe 25 receives cold water from a source thereof via a solenoid valve 26. The pipe 25 extends into the outlet pipe 12 and upwardly through the open top end thereof into the cylindrical bottom end 26 of the partition 22. An 0-ring 27 forms a seal between the partition 22 and the inlet pipe 25. A disc-shaped baffle plate 28 is mounted above the outlet end 26 of the pipe 25. The partition 22 defines the base and sides of an inlet reservoir 29 for receiving cold water from the inlet pipe 25.

The inlet reservoir 29 is covered by a circular cover 31, which has a skirt 32 extending downwardly from the periphery thereof to a location slightly above the bottom wall 3 of the housing 1. A shallow concave depression or indent 34 is provided in the cover 31 with a central opening 35 therein permitting the overflow of water from the inlet reservoir 29. The water flows downwardly between the side wall 2 of the housing 1 and the skirt 32 into a boiling or evaporation chamber 36 defined by the skirt, the bottom wall 3 of the housing and the partition 18. Water is heated in the chamber 36 by a heating element or coil 38. Steam generated in the chamber 36 rises around the top end of the partition 18 and flows downwardly in a condensation passage 39 between the two partitions 18 and 22. Because of the cold water in the inlet reservoir 29, the steam condenses on the bottom of partition 22, flowing downwardly into the outlet pipe 12 for discharge to the storage tank. At the same time the steam and warm water in the passage 39 preheats the water in the inlet reservoir 29.

The upper level of the water in the boiling chamber 36 is determined by an overflow pipe 40 which extends upwardly through the bottom wall 3 of the housing 1 to a position below the bottom end 21 of the partition 18. The pipe 40 extends outwardly through the base 9 and is connected to a drain 41. It will be appreciated that the pipe 40 acts as a steam trap preventing the escape of steam via the drain 41. The pipe 40 and the drain 41 are also connected to a central overflow opening 43 in the cover 31 by an outlet header 44 on the cover 31 and an overflow pipe 45. The header 44 sits in an annular seat 46 on the cover 31. An 0-ring 47 seals the header 44 in the seat 46. An 0-ring 49 is also provided in the wall 2 of the housing 1 around the pipe 45. Anti-siphoning openings 50 are provided in the overflow pipe 45. Because of the overflow, opening 43 is higher and much larger than the opening 35 in the cover 31. Any gases separating from the water in the inlet 29 escape through the overflow pipe 45 and the drain 41.

Operation of the apparatus is controlled by a control 52 containing a solid state circuit board 53 connected to a variety of valves, relays and switches described hereinafter in greater detail with reference to FIG. 4. The flow of water into the inlet reservoir 29 is controlled by the solenoid valve 26. A temperature rise in the outlet tube 12 is an indication that the temperature of the water in the reservoir chamber 29 has risen and that the water level in the boiling chamber 36 has dropped. A thermistor 54 on the side of the outlet pipe 12 senses the temperature rise and when such temperature exceeds a predetermined maximum, the thermistor via the control circuit causes the valve 26 to open to introduce more cold water, which fills the inlet reservoir 29. Thus, the boiling chamber 36 is filled and the temperature in the inlet reservoir 29 drops. During filling of the inlet reservoir 29, the bulk (approximately two-thirds) of the water entering the reservoir is discharged via the header 44 and the overflow pipe 45 to the drain 41. This action serves to flush scale and other impurities from the reservoir, or at least to reduce the build-up of scale in the inlet reservoir. The flow of excess water through the overflow pipe 45 ensures that the temperature of the water discharged via the drain 41 is relatively low, i.e. no steam is discharged from the apparatus. The remainder of the water passes through the opening onto the cover 31 where it is further preheated, and then flows downwardly between the housing wall 2 and the skirt 32. Additional preheating occurs in this area because the skirt 32 is heated internally. Gases escaping from the preheated water above the cover 31 or outside the skirt 32 escape via the opening 7.

A float switch 55 in the top wall 10 of the distilled water reservoir is connected to the control circuit board 53 controlling a relay 56 via logic in the control circuit board. The relay 56 controls the flow of power to the heating element 38. When the apparatus is placed in operation, i.e. "plugged in", with the float switch in the down position, the control circuit will close the relay 56 to feed power to the heating element 38. At the same time water flows through the open solenoid valve 26 to initiate filling of the inlet chamber 29. The initial water input is for a predetermined time (25 seconds) controlled by a timer in the control circuit. After the initial input, which does not fill the inlet reservoir 29 to overflowing, the temperature of the heating element 38 rises above 230° F., and a limit switch 58 in contact with the element opens to interrupt power to the element 38 which signals the control circuit to open the solenoid valve 26 allowing the apparatus to prime itself, i.e. causing cool water to flow through the inlet pipe 25 into the inlet reservoir and ultimately into the boiling chamber 36. The cool water lowers the temperature of the limit switch 58 to close the latter. There is a another 25 second delay to ensure that the apparatus is properly filled or primed.

If the switch 58 detects a temperature in excess of 212° F., i.e. the boiling chamber 36 contains no water (for any reason), the switch 58 opens to trigger a timer (not shown) in the control circuit which opens the inlet solenoid valve 26 and deactivates the relay 56. The resulting priming action continues for a set period of time (e.g. the 25 seconds mentioned above) after the limit switch 58 cools and closes. The priming action ensures that the apparatus is filled with cool water.

The apparatus is now in the distillation mode. The steam produced in the boiling chamber 36 condenses in the condensation passage 39 and produced water flows through the outlet tube 12 into the holding tank beneath the apparatus. When the distilled water reaches a predetermined temperature, which is detected by the thermistor 54, the control circuit opens the inlet solenoid 26 to feed more cold water into the inlet reservoir 29. The duration of each feed cycle is controlled by the timer. This action will occur several times each minute. When the distilled water tank is full, the float switch 55 rises (closes) to interrupt power to the heating element 38. Thus, distillation in the chamber 36 ceases.

Figure 2:
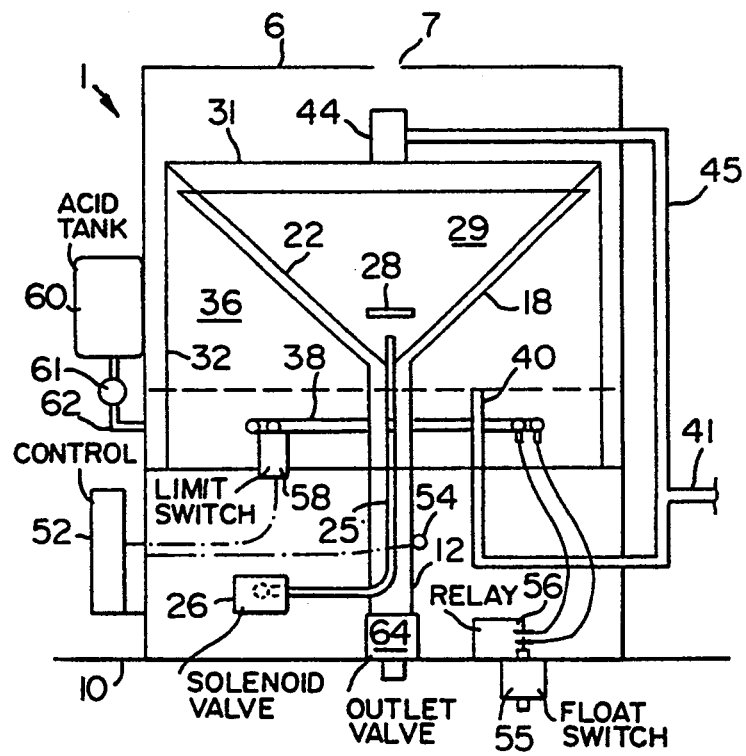
FIGS. 2 and 3 are schematic, longitudinal sectional views of second and third embodiments of the apparatus of the present invention.
Figure 3:
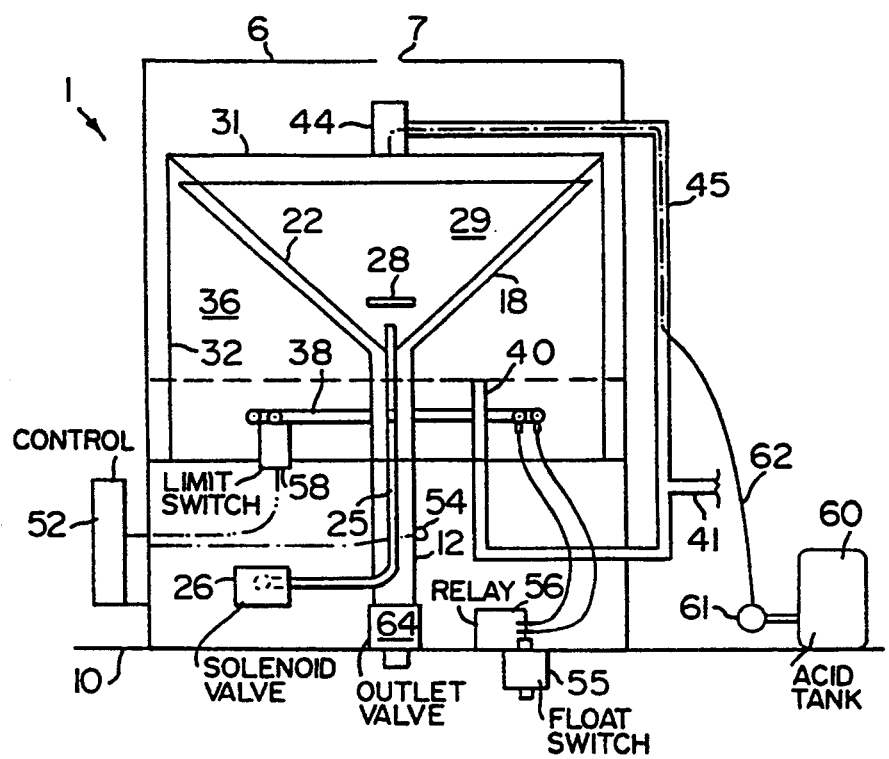

Referring to FIGS. 2 and 3 of the drawings, second and third embodiments of the apparatus include automatic cleaning elements. In each case, an acid tank 60 (containing a food grade acid, e.g. dilute phosphoric acid) is provided outside of the housing 1. In the apparatus of FIG. 2, the tank 60 is mounted on the side wall 2 of the housing 1 for gravity feeding acid via a solenoid valve 61 and a pipe 62 into the bottom end of the housing. In the apparatus of FIG. 3, the tank 60 is mounted on the top wall 10 of the distilled water tank. The inlet pipe 62 extends upwardly into the overflow pipe 45 and into the header 44 for feeding acid into the inlet reservoir 29. In this case, a small pump (not shown) is required to ensure acid feed.

The operation of the apparatus of FIGS. 2 and 3 will be described with reference to FIG. 4. The distillation operation performed in the apparatuses of FIGS. 2 and 3 is the same as in the apparatus of FIG. 1. An outlet or isolation valve 64 is provided in the outlet pipe 12. The valve 64 remains open during normal operation (distillation). The normally open valve 64 is closed at the beginning of a cleaning operation or when power to the apparatus is interrupted to isolate the apparatus from the distilled water reservoir. A modification to the control circuit allows for initiation of a cleaning cycle by closing of a switch (not shown) on the control 52. Closing of the switch causes interruption of power to the heating element 38, and closing of the isolation or outlet valve 64. A timer 66 (FIG. 4) in the control circuit causes a switch delay to allow cooling. Following the delay, the solenoid valve 61 is opened (and, if present, the acid feed pump is actuated) to feed acid into the apparatus. Any overflow passes through the overflow pipe 45 to the drain 41. The timer 66 maintains the system idle for a 5 sufficient time period to enable the acid to clean the interior of the apparatus. After such additional idle time, the inlet solenoid 26 is opened allowing fresh water to flush the apparatus. Thus, all acid and any minerals dissolved therein are removed via the drain 41. After flushing, the apparatus reverts to normal distillation, the isolation valve 64 opening and the heating element 38 being activated. The control circuit is such that the apparatus cannot enter the cleaning cycle when the distilled water reservoir is full, i.e. the float switch 55 is closed. When the reservoir is full, the switch 55 disables the cleaning portion of the control circuit which ensures that cleaning occurs only when the apparatus is still somewhat warm, i.e. when the acid is more effective.

Figure 4:
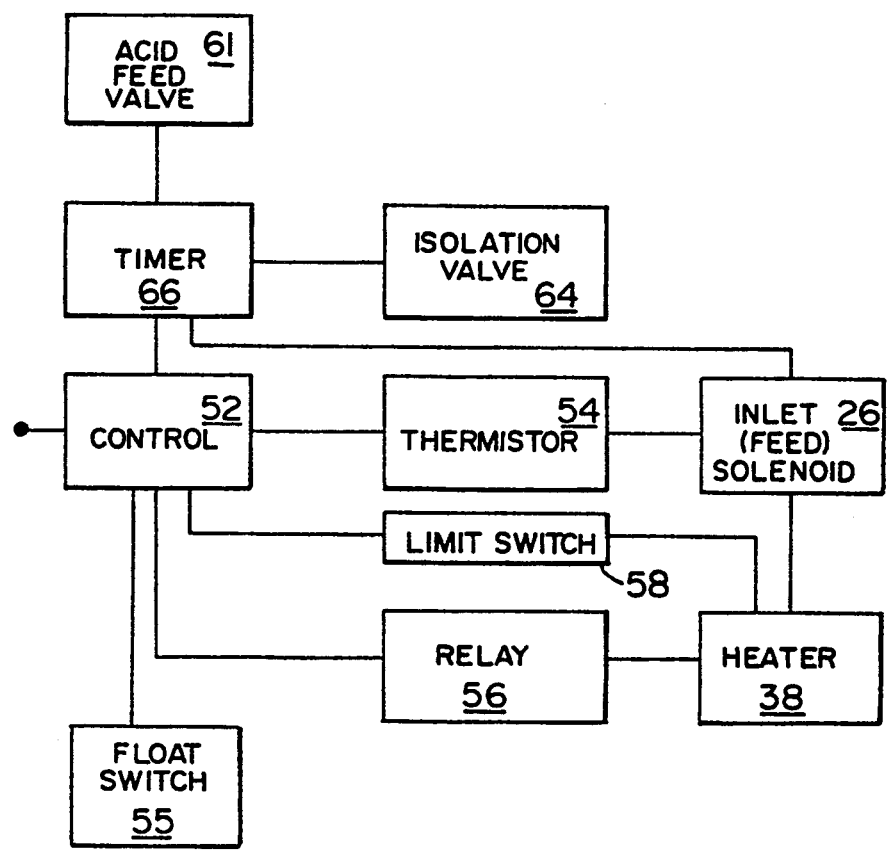
FIG. 4 is a schematic circuit diagram of the various flow control elements of the apparatus illustrated in FIGS. 2 and 3.

It will be appreciated that the control circuit used to operate the apparatus of FIG. 1 is essentially the same as the circuit of FIG. 4, except that the acid feed valve 61 and the isolation valve are omitted.

We claim:

1. A water distillation apparatus comprising housing means; first and second spaced apart, inverted conical-shaped partition means in said housing means; skirt means extending downwardly from an open upper end of said first partition means to a location above the bottom of said housing means, said first and second partition means and said skirt means dividing the interior of the housing means into an inlet reservoir chamber for cold water above said first partition means, a lower boiling chamber beneath said second partition means and an inclined condensation passage between said first and second partition means; inlet means for introducing cold water into the bottom of said reservoir chamber for overflow into said boiling chamber; inlet valve means in said inlet means controlling the flow of water into said reservoir chamber; heater means in said boiling chamber for heating water in said boiling chamber to produce steam; drain means in said boiling chamber for discharging water from the boiling chamber when the water exceeds a predetermined level in said boiling chamber; outlet means in fluid communication with said condensation passage for discharging water condensing therein from said housing means; cover means on the open upper end of said first partition means; a first opening in said cover means permitting the overflow of water to said boiling chamber; and overflow means in said cover means providing fluid communication between said cover means and said drain means, whereby during filling of said reservoir chamber cold water overflows into said boiling chamber, and because of over filling, cold water overflows from said reservoir chamber and from said boiling chamber into said drain means to reduce mineral deposits in said housing means.

2. A distillation apparatus according to claim 1, including indent means in said cover means extending downwardly into said reservoir chamber, said indent means containing said first opening beneath the plane of said cover means, and said overflow means having an entrance in said cover means, whereby gases separating from the water in said reservoir means pass through said overflow means into said drain means.

3. A distillation apparatus according to claim 2, wherein said entrance into said overflow means is substantially larger than said first opening, whereby the bulk of the water entering said reservoir means is discharged therefrom through said overflow means and said drain means.

4. A distillation apparatus according to claim 3, wherein said drain means is generally U-shaped, whereby the drain means functions as a steam trap, preventing the discharge of steam from the reservoir chamber.

5. A distillation apparatus according to claim 1, including isolation valve means in said outlet means for isolating the interior of said housing means except with respect to said drain means whereby water introduced through said inlet valve means can be circulated through said housing means and discharged through said drain means to clean the interior of said housing means.

6. A distillation apparatus according to claim 5, including acid inlet line means in said housing means for introducing acid into said housing means; and acid valve means for controlling the flow of acid into said housing means, said acid valve means being inoperable unless said isolation valve means is closed.

7. A distillation apparatus according to claim 1, including thermistor means on said outlet means for detecting the temperature of the water in said outlet means to cause said inlet valve means to open permitting the introduction of fresh water into said inlet reservoir and consequently into said boiling chamber.

8. A distillation apparatus according to claim 7, including timer means connected to said inlet valve means for controlling the volume of fresh water entering said inlet reservoir, whereby the thermistor means and timer means cause cyclical opening and closing of said inlet valve means.

9. A distillation apparatus according to claim 1, including limit switch means for opening when the temperature of said heater means rises to a predetermined maximum, whereby power to said heater means is interrupted in the absence of water in said boiling chamber.

10. A distillation apparatus according to claim 1, wherein said housing means includes a top wall; and a second opening in said top wall for discharging gases from said housing means.

* * * * *